United States Patent
Tanaka

Patent Number: 5,890,202
Date of Patent: Mar. 30, 1999

[54] METHOD OF ACCESSING STORAGE UNITS USING A SCHEDULE TABLE HAVING FREE PERIODS CORRESPONDING TO DATA BLOCKS FOR EACH STORAGE PORTION

[75] Inventor: Ryuta Tanaka, Kanagawa, Japan

[73] Assignee: Fujitsu Limited, Kanagawa, Japan

[21] Appl. No.: 563,580

[22] Filed: Nov. 28, 1995

[30] Foreign Application Priority Data

Nov. 28, 1994 [JP] Japan ................................. 6-292923

[51] Int. Cl.⁶ ............................ G06F 12/00; G06F 13/10
[52] U.S. Cl. ......................... 711/111; 711/114; 395/672; 395/673
[58] Field of Search ............... 395/441, 182.05, 395/472, 672, 675, 673, 826; 348/7, 443; 711/114, 145, 111

[56] References Cited

U.S. PATENT DOCUMENTS

| | | | |
|---|---|---|---|
| 4,964,046 | 10/1990 | Mehrgardt et al. | 395/800.36 |
| 5,124,987 | 6/1992 | Milliga et al. | 395/182.05 |
| 5,157,620 | 10/1992 | Shaar | 364/578 |
| 5,272,697 | 12/1993 | Fraser et al. | 370/235 |
| 5,276,682 | 1/1994 | Van As et al. | 370/443 |
| 5,432,922 | 7/1995 | Polyzois et al. | 395/182.04 |
| 5,473,362 | 12/1995 | Fitzgerald et al. | 348/7 |
| 5,488,564 | 1/1996 | Ikeda | 364/474.16 |
| 5,519,606 | 5/1996 | Frid-Nielsen et al. | 705/9 |
| 5,532,923 | 7/1996 | Sone | 364/138 |
| 5,544,327 | 8/1996 | Dan et al. | 395/200.64 |
| 5,551,003 | 8/1996 | Mattson et al. | 711/136 |
| 5,579,474 | 11/1996 | Kakuta et al. | 395/182.04 |
| 5,619,502 | 4/1997 | Kahn et al. | 370/397 |
| 5,655,096 | 8/1997 | Branigin | 395/376 |

FOREIGN PATENT DOCUMENTS

| | | |
|---|---|---|
| 63-8924 | 1/1988 | Japan . |
| 2-214922 | 8/1990 | Japan . |

OTHER PUBLICATIONS

Multimission Modular Spacecraft (MMS) Onboard Computer (OBC) Flight–Executive Technical Description, Goddard Space Flight Center, 2–1 to 2–11, Feb. 1988.

Primary Examiner—Eddie P. Chan
Assistant Examiner—Hong C. Kim
Attorney, Agent, or Firm—Helfgott & Karas, PC.

[57] ABSTRACT

A method is disclosed of accessing a storage device in which each sequence of data is divided into a unit data for distributively to be stored in a plurality of storage units and the stored unit data is sequentially read out. A schedule table is provided for managing access stuations to each of storage portions of a storage device for each unit data, and further a blank interval which corresponds to one unit data is sequentially provided with a storage area for storing accessing status to each storage portion in the schedule table. For example, when a request to change the order of accessing a sequence of data is issued, the order of accessing a sequence of data can be changed with ease by writing a name of the user who issued the request to change, then followed by sequentially writing the name of the user in a blank area which corresponds to storage portions to be accessed next.

11 Claims, 14 Drawing Sheets

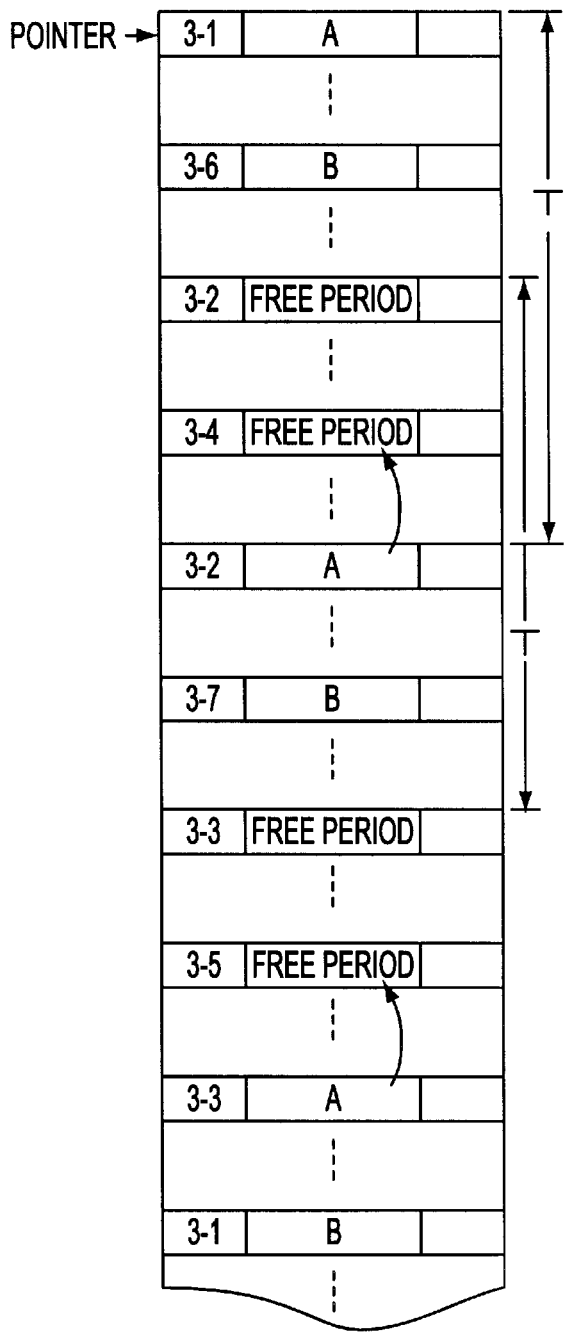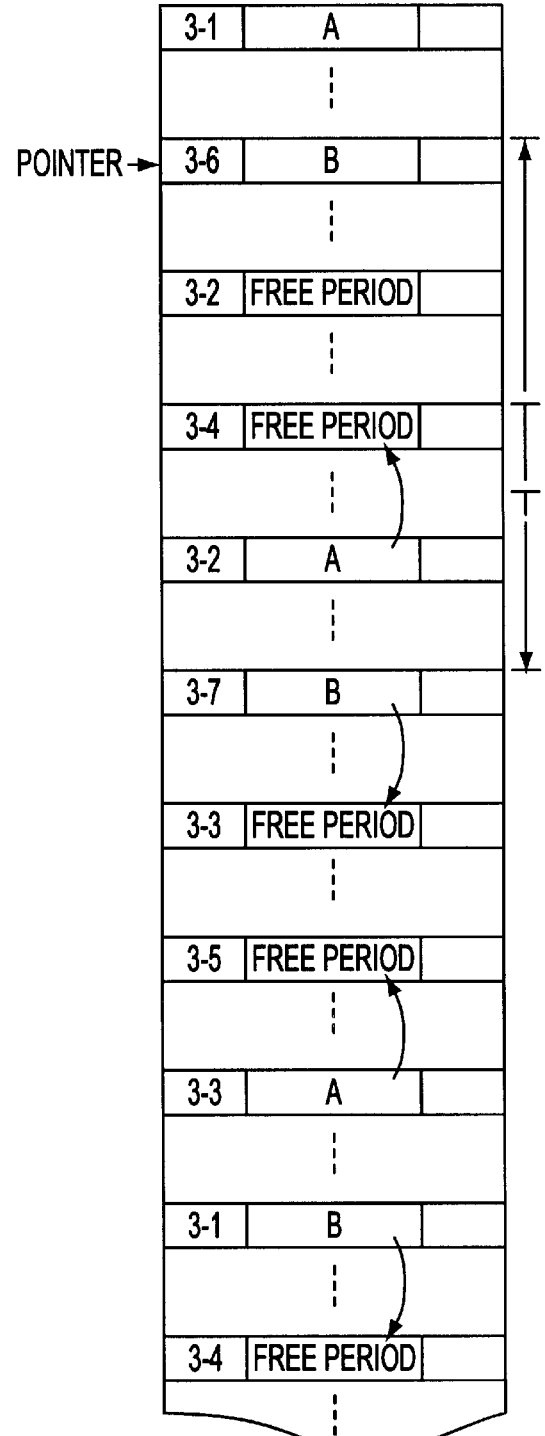
FIG. 11A
FIG. 11B

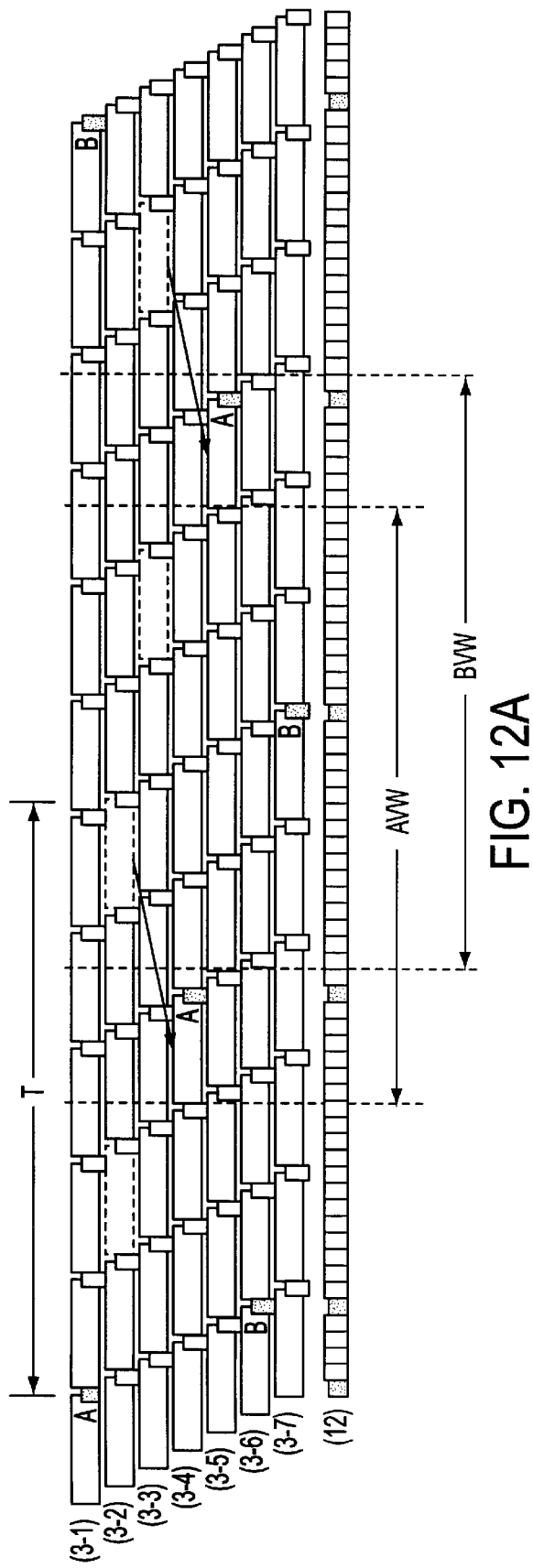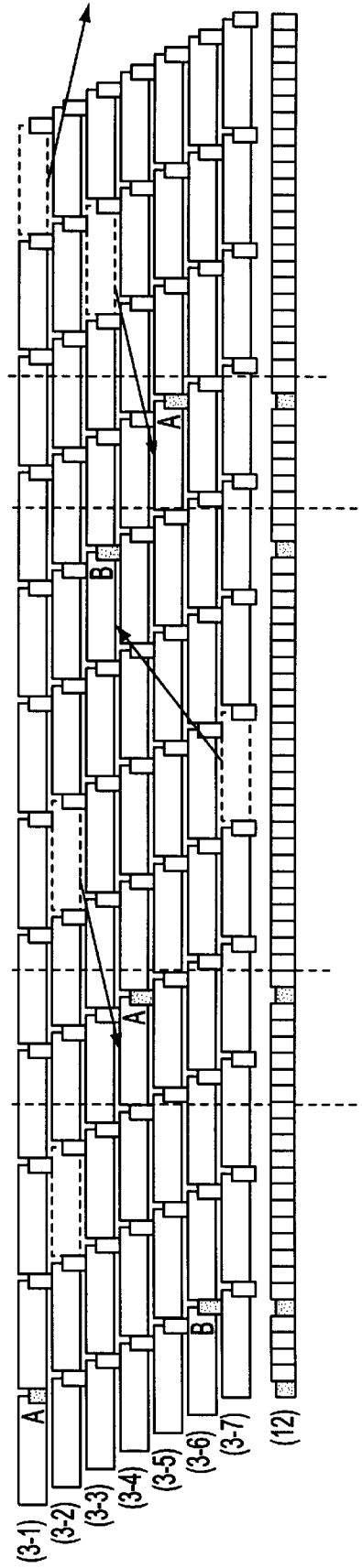

METHOD OF ACCESSING STORAGE UNITS USING A SCHEDULE TABLE HAVING FREE PERIODS CORRESPONDING TO DATA BLOCKS FOR EACH STORAGE PORTION

BACKGROUND OF THE INVENTION

1. Field of the Invention

The present invention relates to a method of accessing a storage unit having a plurality of storage portions that are, for example, magnetic disk units.

2. Description of the Related Art

A storage unit that distributively writes data blocks of a plurality of data sequences to a plurality of storage portions, and that successively reads the data blocks of the data sequences from the storage portions, is known. However, an effective accessing method for such a storage unit has been desired.

FIG. 1 is a schematic diagram showing an example of a conventional storage unit. The storage unit has seven disk units DSK 1 to DSK 7. In FIG. 1, title 1-1, title 1-2, title 1-3, . . . and so forth represent divided data blocks of a data sequence title 1. Likewise, title 2-1, title 2-2, title 2-3, . . . , title 7-1, title 7-2, . . . and so forth represent divided data blocks of data sequences title 2 to title 7. These data blocks are distributively written to the magnetic disk units DSK 1 to DSK 7. The method for distributively storing data blocks to a plurality of storage portions such as magnetic disk units is referred to as a striping method.

When the data sequence title 1 is designated and read, the data blocks title 1-1, title 1-2, title 1-3, and so forth are successively read from the magnetic disk units DSK 1, DSK 2, DSK 3, and so forth, respectively. In other words, the magnetic disk units are accessed in the order of DSK 1, DSK 2, DSK 3, DSK 4, DSK 5, DSK 6, DSK 7, DSK 1, and so forth. When a data sequence title 6 is designated and read, the magnetic disk units are accessed in the order of DSK 6, DSK 7, DSK 1, DSK 2, DSK 3, DSK 4, DSK 5, DSK 6, DSK 7, and so forth in such a manner that this access operation does not interfere with the other data access operation for the data blocks title 1-6, title 1-7, and so forth.

For example, assume that a data sequence is video data, that a data block is composed of one frame or several frames, and that a title 2 is designated. In this case, the first data block is read from the magnetic disk unit DSK 2 as title 2-1. The next data block is read from the magnetic disk unit DSK 3 as title 2-2. On the other hand, the receive and playback side buffers the data blocks so as to restore the original sequence of the video data. Alternatively, video data can be compressed corresponding to a standardized compression encoding method such as MPEG (Moving Picture Experts Group) and distributively stored as data blocks, each of which is composed of one frame or several frames.

In the storage unit having the storage portions such as the magnetic disk units DSK 1 to DSK 7, when a data sequence is distributively stored thereto and then the beginning to the end of the data sequence are successively read therefrom, the data blocks can be successively read from the magnetic disk unit DSK 1 to DSK 7 in such a process. However, for example, an order changing operation of a data sequence (for example, a fast forward operation or a rewind operation of moving picture data) or an access changing request for accessing another data sequence cannot be quickly performed.

SUMMARY OF THE INVENTION

An object of the present invention is to provide a method for allowing an access order changing request for a data blocks of data sequence stored in a plurality of storage portions of a storage unit or an access destination changing request for accessing another data sequence to be quickly performed.

The present invention is an accessing method of a storage unit, comprising the steps of dividing each of a plurality of types of data sequences into data blocks, and distributively writing the divided data blocks to a plurality of storage portions or successively reading the data blocks of the data sequences from the storage portions, wherein the storage unit has a schedule table for managing access situations for the storage portions corresponding to each of the data blocks, and wherein the areas for storing the access situations of the storage portions of the schedule table have respective free periods corresponding to data blocks.

According to the accessing method of the present invention, since the schedule table has free periods corresponding to the individual storage portions, when the user issues an access order changing request, an access changing request for accessing another data sequence, or the like, the access schedule can be changed using the free periods. For example, when a storage portion that stores the first data block of a new access destination is free, the free storing portion is designated to the next access destination. When the subsequent free storing portion is accessed, the desired data blocks can be successively accessed. Thus, when free periods are predesignated to the storage portions, the schedule can be easily changed.

If a desired storage portion is busy, the next access destination is designated to an adjacent free storage portion. Thus, data blocks adjacent to the desired data block can be successively accessed.

These and other objects, features and advantages of the present invention will become more apparent in light of the following detailed description of best mode embodiments thereof, as illustrated in the accompanying drawings.

BRIEF DESCRIPTION OF DRAWINGS

FIG. 11 (A) is a schematic diagram showing contents of the schedule table in the case that a user A issues an access schedule changing request;

FIG. 11 (B) is a schematic diagram showing contents of the schedule table in the case that a user B issues an access schedule changing request;

FIGS. 12 (A) and (B) are schematic diagrams for explaining an access operation for an access schedule changing request;

DESCRIPTION OF PREFERRED EMBODIMENTS

Figure 1:
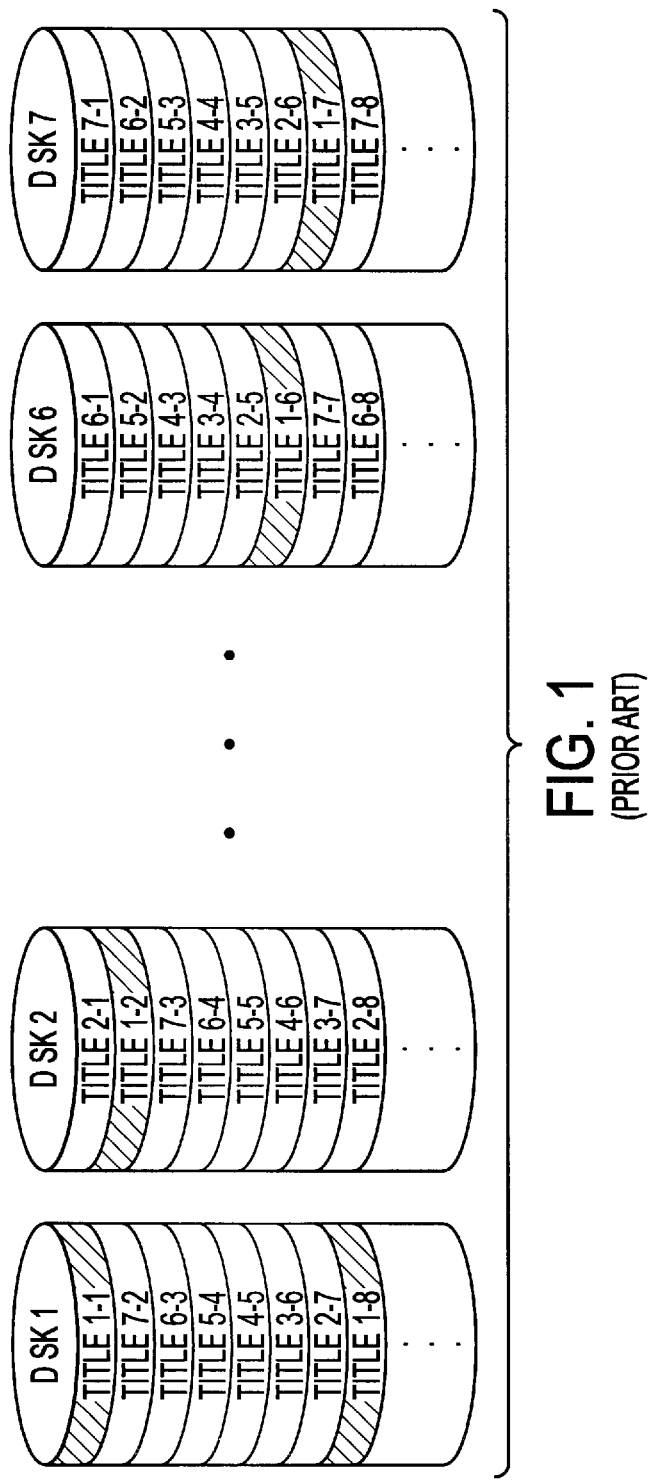
FIG. 1 is a schematic diagram for explaining a conventional storage unit.

Next, with reference to FIG. 2, the construction and the operation of an accessing method of a storage unit according to the present invention will be described.

(1) The system of the present invention comprises a control unit 1 and a storage unit 2. The storage unit 2 has a plurality of storage portions 3-1 to 3-n. A plurality of data sequences are divided into data blocks and distributively written to the storage portions 3-1 to 3-n. Alternatively, data blocks of a data sequence are successively read from the storage portions 3-1 to 3-n. The control unit 1 has a schedule table 13. The schedule table 13 has at least one free period corresponding to each data block and manages access situations of the storage portions 3-1 to 3-n at individual periods. When a new access request is sent to the control unit 1, it references the schedule table 13 and determines whether or not to accept the access request. When the control unit 1 can accept the access request, it performs an access control for the storage unit 2.

(2) When the access request is an access order changing request for changing the access order of a data sequence or an access changing request for accessing another data sequence, the control unit 1 references the schedule table 13 and accesses a new access destination corresponding to the access schedule changing request using a free period corresponding to each data block.

(3) When the access request is an access order changing request for changing the access order of a data sequence or an access changing request for accessing another data sequence, the control unit 1 references the schedule table 13 and accesses a position apart from the start position corresponding to the access request by a predetermined number of data blocks in such a manner that data continuity is maintained using a free period corresponding to one data block.

(4) A first-in first-out (FIFO) format buffer memory 9 is disposed in the control unit 1. Thus, data blocks that are successively read from the storage portions 3-1 to 3-n of the storage unit 2 and that are read from a new access destination corresponding to an access schedule changing request to the storage unit 2 can be send through the buffer memory 9 at a predetermined transmission speed.

(5) The schedule table 13 has an area for storing an access request source and at least one free area. The schedule table 13 stores storage portion representing information that represents one of the storage portions 3-1 to 3-n to be accessed. Contents of the area to be referenced for the storage portions 3-1 to 3-n are stored in an area that is referenced at the next period. When an access schedule changing request is issued, a desired access destination can be accessed using the free area.

(6) In the free period of the schedule table 13, the control unit 1 can execute other than an access control for the storage portions 3-1 to 3-n of the storage unit 2.

(1) The storage unit 2 is constructed of the storage portions 3-1 to 3-n. Each of the storage portions 3-1 to 3-n comprises a storage medium 4 (for example, a magnetic disk or an optical disc) and a buffer memory 5 that buffers data exchanged with a common bus 12. Divided data blocks of a data sequence are distributively written to the storage portions 3-1 to 3-n. Alternatively, the data blocks are successively read from the storage portions 3-1 to 3-n. The control unit 1 comprises a processor 6, a main memory 7, an input/output control unit 8, a buffer memory 9, an interface portion 10, and an internal bus 11. The schedule table 13 formed in the main memory 7 or the like of the control unit 1 has a free period corresponding to one data block. The schedule table manages access situations of the storage portions 3-1 to 3-n at individual periods. The control unit 1 determines whether or not to accept an access request corresponding to the schedule table 13. When the control unit can accept the access request, it updates the schedule table 13 and performs the access control.

(2) When an access request for reading a data sequence with skipping of a plurality of blocks thereof, another access request for reading a data sequence with a reverse jump, or a further other access request for reading another data sequence is issued, the control unit 1 references the schedule table 13, reads data blocks corresponding to the access schedule changing request using a free period, and correspondingly updates the schedule table 13.

(3) When an access schedule changing request is issued, an access control operation is performed so that a data block adjacent to the first data block of the access destination corresponding to the access schedule changing request is read rather than the start position of the designated destination. Thereafter, the data blocks can be successively read. In other words, when the length of each data block is relatively small, even if the access destination has a deviation of a plurality of data blocks, the rest of the data sequence can be read as successive data.

(4) When data blocks read from the storage unit 2 are buffered by the FIFO format buffer memory 9, even if the read period of data blocks varies corresponding to the access schedule changing request, a predetermined transmission speed can be maintained.

(5) The schedule table 13 has an area for storing an access request source and at least one free area. In the schedule table 13, an area is referenced by a pointer or the like. In this area, storage portion representing information that represents one of the storage portions 3-1 to 3-n and other information are stored. A user name and information that represents data accessed at a next period are stored in an area that is accessed corresponding to the storage portion representing information and the other information. Thus, when the access schedule changing request is issued, these areas including the free area are referenced so as to access a designated access destination.

(6) When the pointer indicates a free period in the schedule table 13 without the access schedule changing request, since the control unit 1 does not perform the access control for the storage unit 2, the control unit 1 determines the free period and executes another process. Thus, the control system can be effectively operated. In the free period, the control unit 1 can perform, for example, a head position compensating process for the storage unit 2. Thus, when the head position compensating process should be periodically performed, it can be scheduled as well as the write and read processes.

Figure 2:
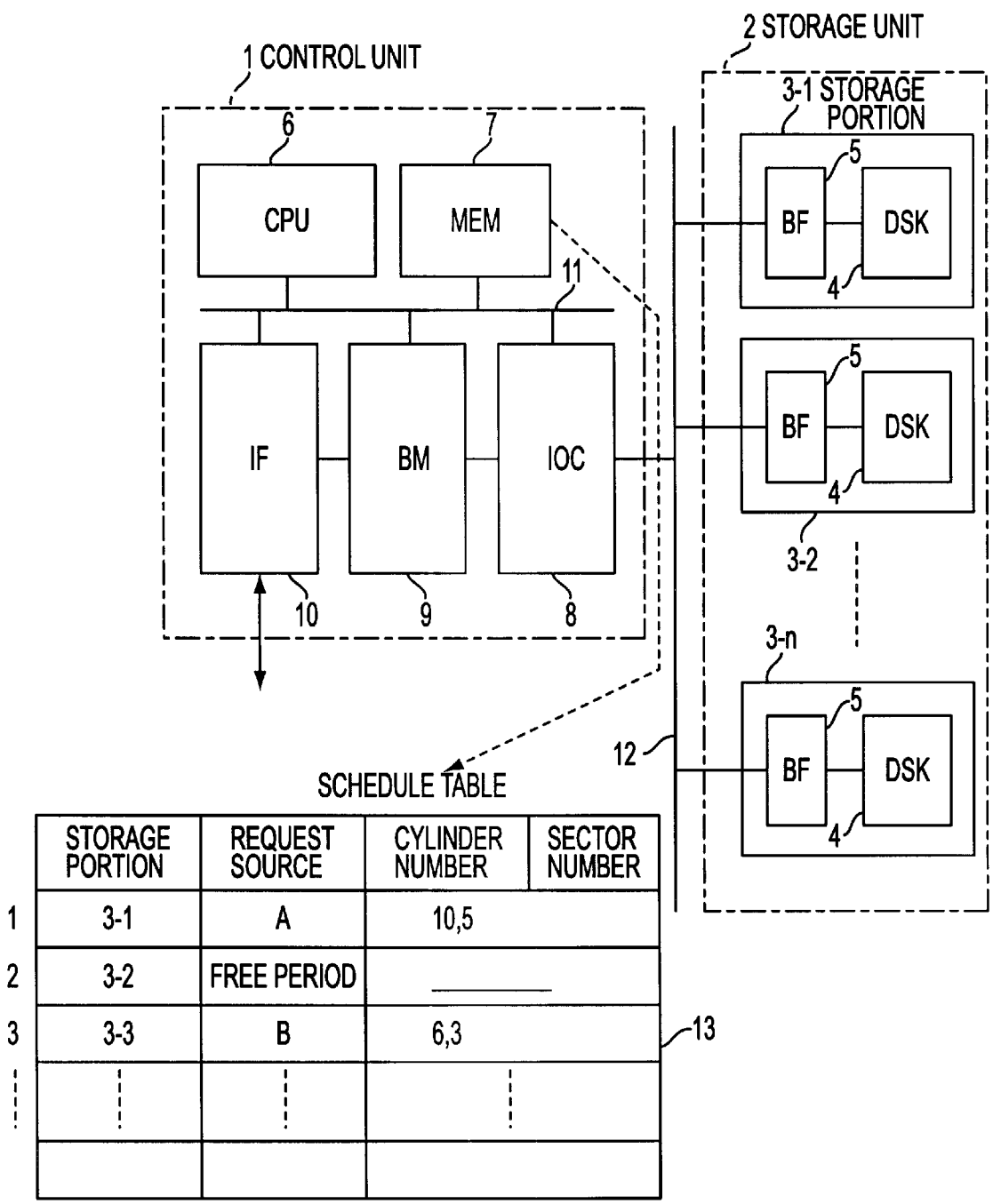
FIG. 2 is a block diagram for explaining a storage unit according to an embodiment of the present invention.

FIG. 2 is a block diagram for explaining a storage unit for use with an accessing method according to an embodiment of the present invention. The storage unit 2 that has the storage portions 3-1 to 3-n are connected to the control unit 1 through the control bus 12. The common bus 12 is, for example, a SCSI (Small Computer System Interface) bus. Thus, the input/output control unit 8 is a SCSI controller. In FIG. 2, the main memory 7 has the schedule table 13. However, it should be noted that the schedule memory may be formed in another memory area. When the input/output control unit 8 and the buffer memory 9 are directly connected and the buffer memory 9 and the interface portion 10 are directly connected, rather than through the internal bus 11 that is mainly used by the processor 6, data can be transmitted at high speed.

The schedule table 13 has areas for storage portion representing information that represents one of a plurality of storage portions, an access request source, a cylinder number, and a sector number. The cylinder number and the sector number represent the position of a data block stored on a magnetic disk. In addition, the schedule table 13 has areas for access request sources and at least one free area. For example, corresponding to the storage portion representing information of the storage portion 3-1, request source A, cylinder number 10, and sector number 5 are written. Corresponding to the storage portion representing information of the storage portion 3-2, information that represents this area is free. Corresponding to the storage portion representing information of the storage portion 3-3, access source B, cylinder number 6, and sector number 3 are written. It should be noted that title information of data sequences may also be stored.

The amount of data in each data block can be designated corresponding to a data group such as sectors that are read from or written to the storage portions 3-1 to 3-n, the number of storage portions 3-1 to 3-n (thus, the value of n), the storage capacity of the buffer memory 9, and the read speed from or the write speed to the storage medium 4, such as a magnetic disk.

When the data amount of each data block is small, the data transmission speed decreases. To effectively use the common bus 12, the number of the storage portions 3-1 to 3-n (thus, the value of n) should be increased. On the other hand, when the amount of data in each data block is large, although the data transmission speed can be increased, the storage capacity of the buffer memory 9 should be increased. When data is read from a designated position of a data sequence, the flexibility deteriorates. Thus, in consideration of these points, the amount of data in each data block should be designated. In addition, the amount of data in each data block can be varied to each data sequence.

The sum of the maximum number of service request sources and the number of free periods should be (n×m+k) (where m is an integer equal to or greater than 1; k is an integer that satisfies the condition of $1 \leq k < n$; and the relation between (n×m+k) and n is prime to each other). Thus, the size of the schedule table 13 is 2(n×m+k). Consider the case that the number of storage portions n=7, the number of maximum service request sources=34, and the number of free periods=2. When a title is successively written to the storage portions 3-1 to 3-n in order, if m=5 and k=1, the above-described conditions are satisfied. When a title is written to the storage portions 3-1 to 3-n at every second storage portion (namely, in the order of the storage portions 3-1, 3-3, 3-5, 3-7, 3-2, 3-4, 3-6, 3-1, 3-3, . . . and so forth), k should be 2. When the pointer indicates 1, the storage portion 3-1 and the request source A are written to an area that is referenced next corresponding to access period. The cylinder number and the sector number are represented by the value of which the amount of data in the data block and the number of storage portions are added. The control unit 1 references the schedule table 13 and sends an access command to the storage unit 2.

Figure 3:
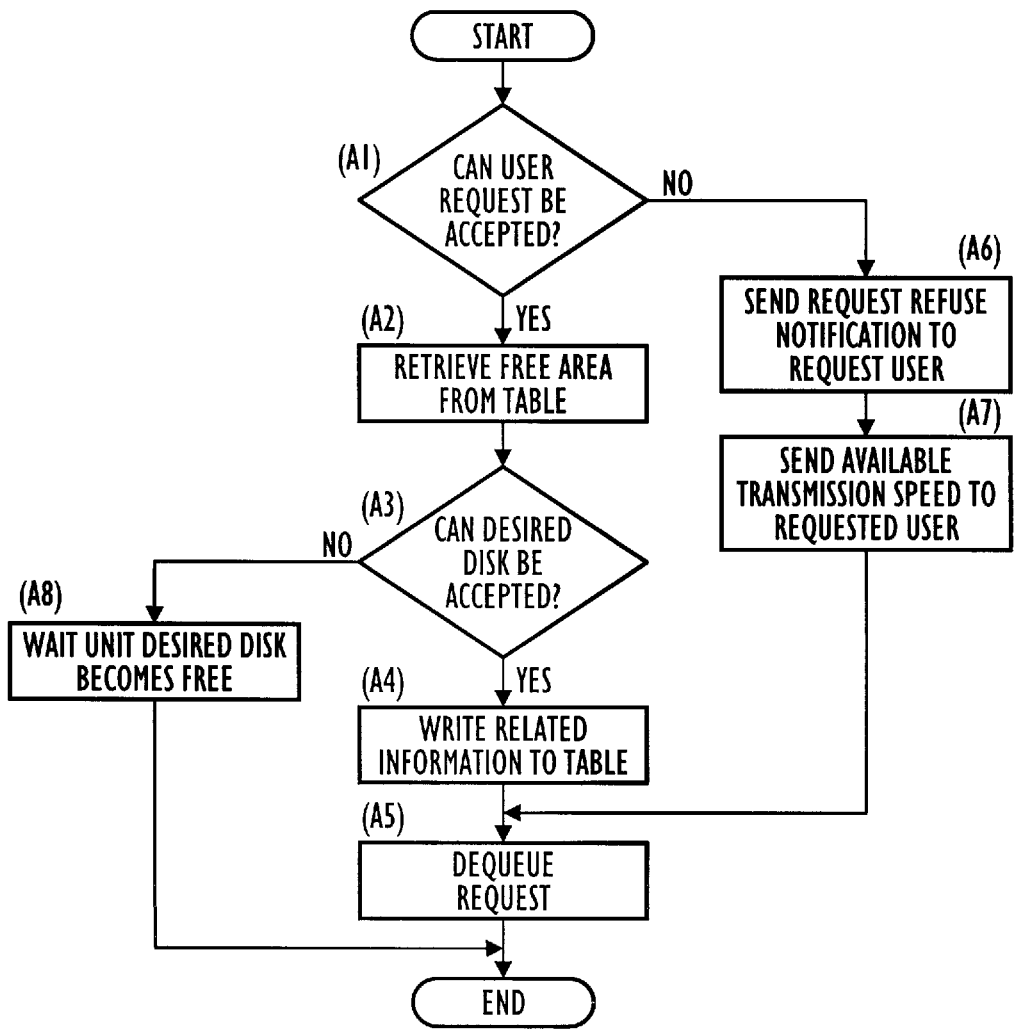
FIG. 3 is a flow chart of an access request process according to an embodiment of the present invention.

FIG. 3 is a flow chart showing an access request process according to an embodiment of the present invention. The control unit 1 determines whether or not to accept an access request issued by a user (at step A1). In other words, when an access request issued by a user through a network (not shown) is sent to a queue (not shown) of the processor 6 through the interface portion 10, the processor 6 is interrupted. This control process can be accomplished by one of several known constructions. The processor 6 determines whether or not to accept the access request with reference to the schedule table 13.

In the case that users (request sources) have been registered to all the request source registration areas other than k free areas of the schedule table 13, when the users that are the maximum service request sources are accessing storage portions (or even if there is a free storage portion, when the requested transmission speed is high), the control unit 1 does not accept the access request and sends a request refuse notification to the access request source (at step A6). When there is an acceptable transmission speed, the control unit 1 sends the transmission speed to the access request source (at step A7). Thereafter, the control unit 1 dequeues the access request (at step A5).

When the control unit 1 can accept the access request, it retrieves a free area from the schedule table 13 (at step A2) and determines whether or not to access a desired disk (storage medium) (at step A3). When the control unit 1 cannot access the desired disk, it waits until the desired disk (storage medium) becomes free (at step A8). At this point, the access request is still queued. When the control unit 1 can access the desired disk (storage medium), it writes data of the user (request source) and the desired disk (storage medium) to the schedule table 13 (at step A4) and dequeues the access request. Thereafter, the control unit 1 issues an access command to the storage unit 2 corresponding to the schedule table 13.

Figure 4:
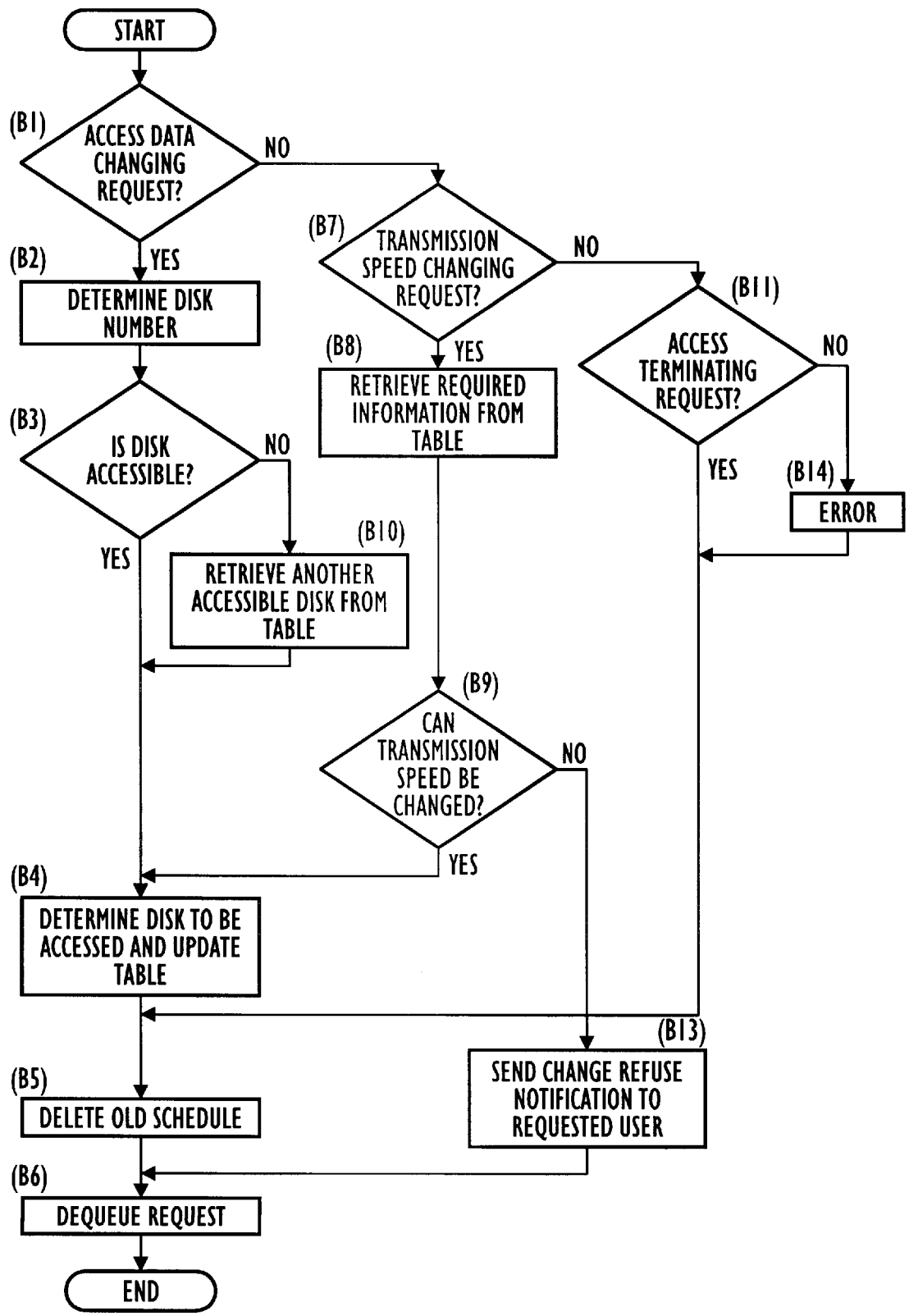
FIG. 4 is a flow chart of an access data changing request process according to an embodiment of the present invention.

FIG. 4 is a flow chart of an access data changing request process according to an embodiment of the present invention. In this case, an access request is also queued. Thus, the processor 6 is interrupted. The control unit 1 determines whether or not the access request is an access data changing request (at step B1). When the access request is a data access order changing request, the control unit 1 determines a disk (storage medium) to be newly accessed (at step B2). Thereafter, the control unit 1 determines whether or not the disk (storage medium) is accessible with reference to the schedule table 13 (at step B3). When the disk (storage medium) is accessible, the control unit 1 determines a disk (storage medium) to be accessed and updates the schedule table 13 (at step B4). Thereafter, the control unit 1 deletes data of the old user (access request source) from the schedule table 13 (at step B5) and dequeues the access request (at step B6).

When the access request is not an access data changing request, the control unit 1 determines whether or not the access request is a transmission speed changing request (at step B7). When the access request is a transmission speed changing request, the control unit 1 determines whether or not to change the transmission speed with reference to the schedule table 13 (at step B9). In other words, when the access request is a request for increasing the transmission speed, the transmission speed can be increased by shortening the access period or increasing the amount of data in the data blocks. Thus, when there are many free users (request sources), the control unit 1 determines that the transmission speed can be changed. In this case, the flow advances to step B4. When the transmission speed cannot be changed, the control unit 1 sends a transmission speed change refuse notification to the user (request source) (at step B13).

When the access request is not a transmission speed changing request, the control unit 1 determines whether or not the access request is an access terminating request (at step B11). When the access request is not an access terminating request, the control unit 1 determines that the queued access request is an error (at step B14). Thereafter, the flow advances to step B5. When the access request is an access terminating request, the flow advances to step B5. At step B5, the control unit 1 deletes data of old user (request source) from the schedule table 13 and dequeues the access request.

Figure 5:
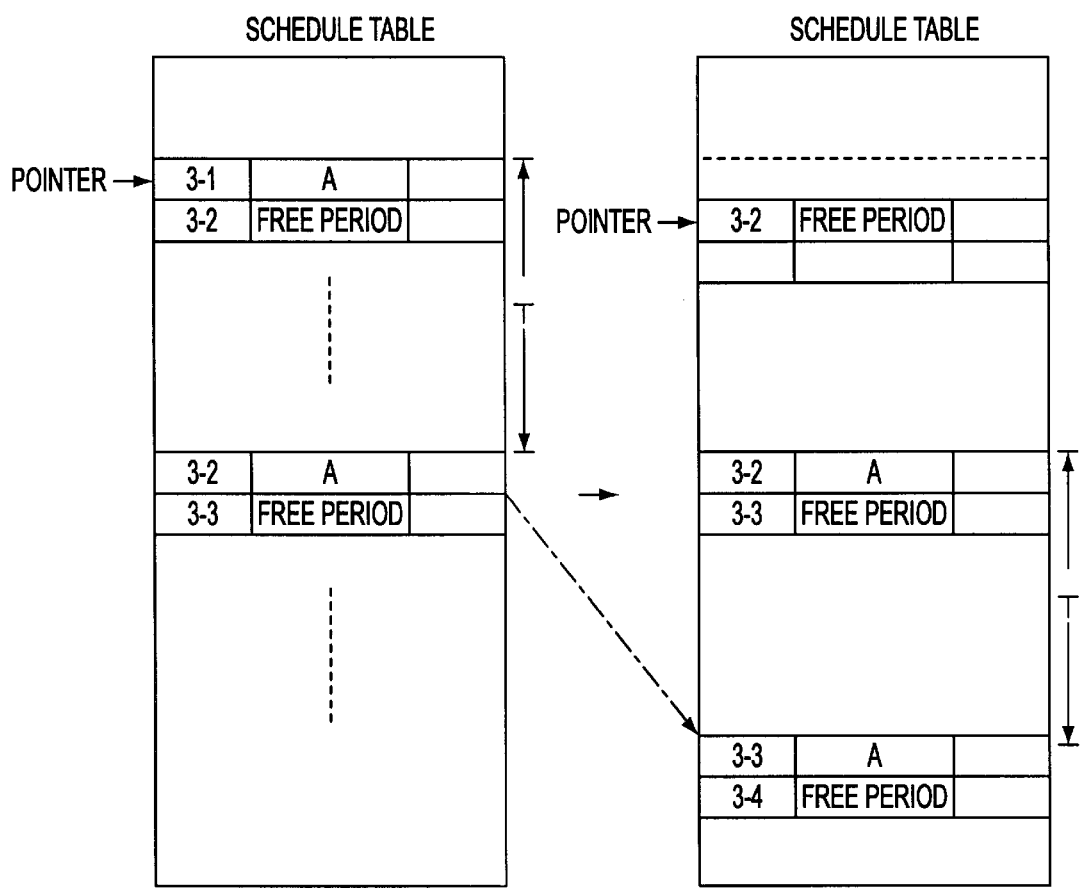
FIG. 5 is a schematic diagram for explaining a schedule table.

FIG. 5 is a schematic diagram for explaining a schedule table according to an embodiment of the present invention. As described above, the schedule table has at least 2 (n×m+k) areas. A reference position of the schedule table is indicated by a pointer. Storage portion representing information and a request source at the reference position are read. An access command corresponding to the storage portion is issued. The same contents are written to an area at a position separated by an access period T from the position indicated by the pointer. In other words, the same request source is written to two areas of the schedule table. The pointer is moved at predetermined time periods. Corresponding to the data of the user (request source) and the storage portion indicated by the pointer, the access control of the storage unit 2 is performed.

As shown in the left side table of FIG. 5, the storage portion representing information of the storage portion 3-1 and the user (request source) A are written to an area indicated by the pointer. At an area separated by the access period T from the area indicated by the pointer, the storage portion representing information of the storage portion 3-2 that is accessed next and the user (request source) A are written. When the control unit 1 sends an access command of the storage portion 3-1 indicated by the pointer to the storage unit 2, the user (request source) A corresponding to the storage portion 3-1 is deleted from the schedule table 13.

Next, as shown in the right side table of FIG. 5, the storage portion 3-2 that is accessed next is indicated by the pointer. Corresponding to the contents of the area for accessing the storage portion 3-2 for the user (request source) A, storage portion representing information of the storage portion 3-3 and information of the user A (request source) are written to an area that is referenced after the access period T. In other words, data of a user (request source) is always written to two areas.

As shown in the right side table of FIG. 5, when the user (request source) of the storage portion 3-2 of the area indicated by the pointer is free (for example, when a free period is designated), the control unit 1 stops sending an access command to the storage unit 2. During this period, the control unit 1 can execute another process such as a maintenance process or a management process. Thus, the efficiency of the control unit 1 is improved.

In addition, areas in which users (request sources) are free are present every access period T. After the control unit 1 stops sending an access command to the storage portion 3-2, the storage portion 3-3 becomes free with the access period T. Thus, each storage portion has a free period. Consequently, with the free period, the control unit 1 can perform a process for an access schedule changing request or the like.

Figure 6:
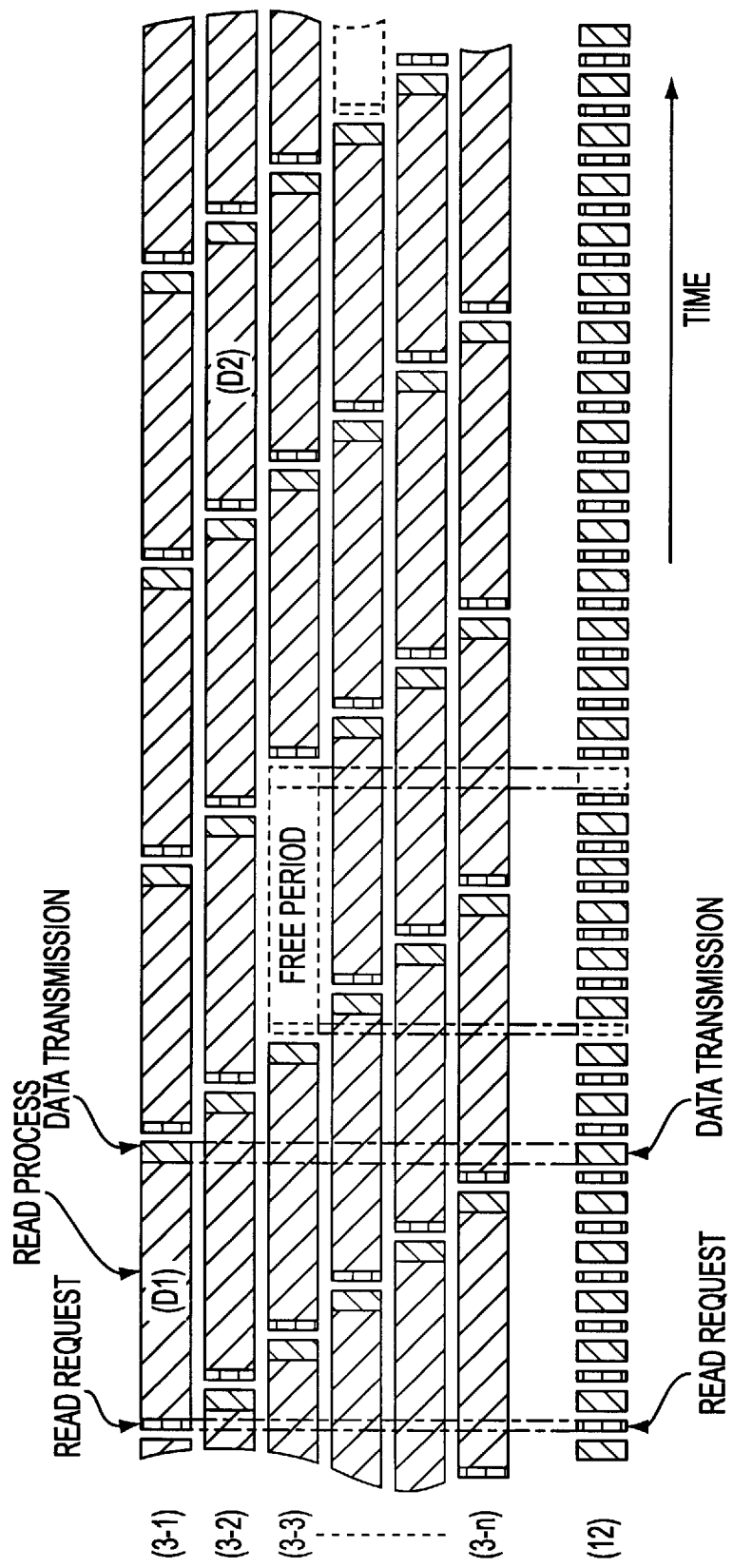
FIG. 6 is a schematic diagram for explaining a data read operation.

FIG. 6 is a schematic diagram for explaining a read operation according to an embodiment of the present invention. In FIG. 6, (3-1) to (3-n) are the storage portions 3-1 to 3-n of a magnetic disk unit or the like. (12) is data on the common bus 12. When the control unit 1 sends a read request including a cylinder number, a sector number, and so forth to the storage portion 3-1 with reference to the schedule table 13, a read process (D1) of a data block is performed from an area with a designated cylinder number and a designated sector number of the storage medium 4, and the data block is written to the buffer memory 5. The data (12) is sent from the buffer memory 5 to the common bus 12 at the required transmission speed.

The control unit 1 can write data at high speed through a path to which the input/output control unit 8 and the buffer memory 9 are directly connected. In addition, the control unit 1 can send data that is read from the buffer memory 9 to the user (request source) as a data sequence at a constant speed through a path to which the buffer memory 9 and the interface portion 10 are directly connected. In other words, a process for obtaining an access right to the internal bus 11 can be omitted. Thus, data can be sent at high speed from the input/output control unit 8 to the buffer memory 9 and from the buffer memory 9 to the interface portion 10. Alternatively, with a double buffer construction of which two buffer memories 9 are used, data can be written to one buffer memory 9, while data can be read from the other buffer memory 9 to the user (request source).

By a read process (D1), a data block of a data sequence is read from the storage portion 3-1 and temporarily stored in the buffer memory 5. The data block is read from the buffer memory 5 and sent to the buffer memory 9 through the common bus 12 and the input/output control portion 8 of the control unit 1. By a read process (D2), the next data block of the data sequence is read from the storage portion 3-2 and then temporarily stored in the buffer memory 5 as denoted by (3-2). The data block is read from the buffer memory 5 and sent to the buffer memory 9 through the common bus 12 and the input/output control portion 8 of the control unit 1. Likewise, the data blocks of the data sequence are successively read from the storage portions 3-3 to 3-n and sent to the buffer memory 9. The data blocks are read from the buffer memory 9 at a constant speed and sent to the user (request source). A free period corresponding to a data block is formed. In FIG. 6, after the storage portion 3-2 is accessed, the storage portion 3-3 becomes free. Thus, on the common bus 12, as denoted by dashed lines, there is a free time slot between a read request and a data transmission. A free period of the storage portion 3-3 is followed by a free period of the storage portion 3-4. However, the influence of the free period on the common bus 12 is small. Thus, the common bus 12 is not adversely affected.

Figure 7:
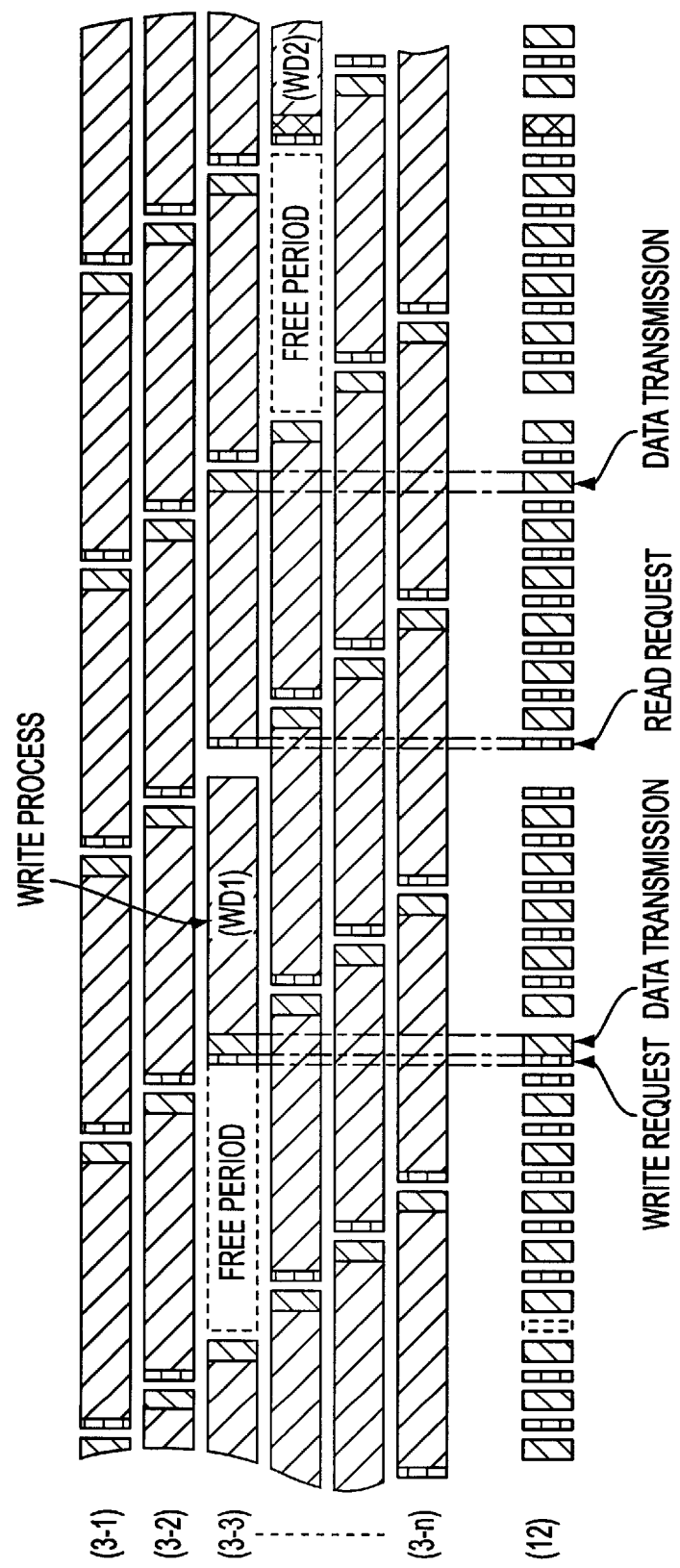
FIG. 7 is a schematic diagram for explaining a data write operation.

FIG. 7 is a schematic diagram for explaining a write operation corresponding to an embodiment of the present invention. As with the case shown in FIG. 6, (3-1) to (3-n) are operations of the storage portions 3-1 to 3-n. (12) is data on the common bus 12. When a write operation is performed, a write request and write data are successively sent to the storage unit 2 through the common bus 12. Consider the case that while the read operation is being performed, the first data block of the write data is written to the storage portion 3-3. Just after a read request for the storage portion 3-2 is issued, a write request for the storage portion 3-3 and write data are sent through the common bus 12. After the free period elapses, the write data is written to the storage medium 4 through the buffer memory 5 of the storage portion 3-3. In other words, the write process for a data block is performed as denoted by (WD1).

In this case, after a data block (WD1) of the data sequence is written to the storage portion 3-3, the next data block (WD2) is written to the storage portion 3-4. In other words, after the free period of the storage portion 3-4 elapses, corresponding to the write request and the write data, the data block (WD2) is written to the storage portion 3-4.

Figure 8:
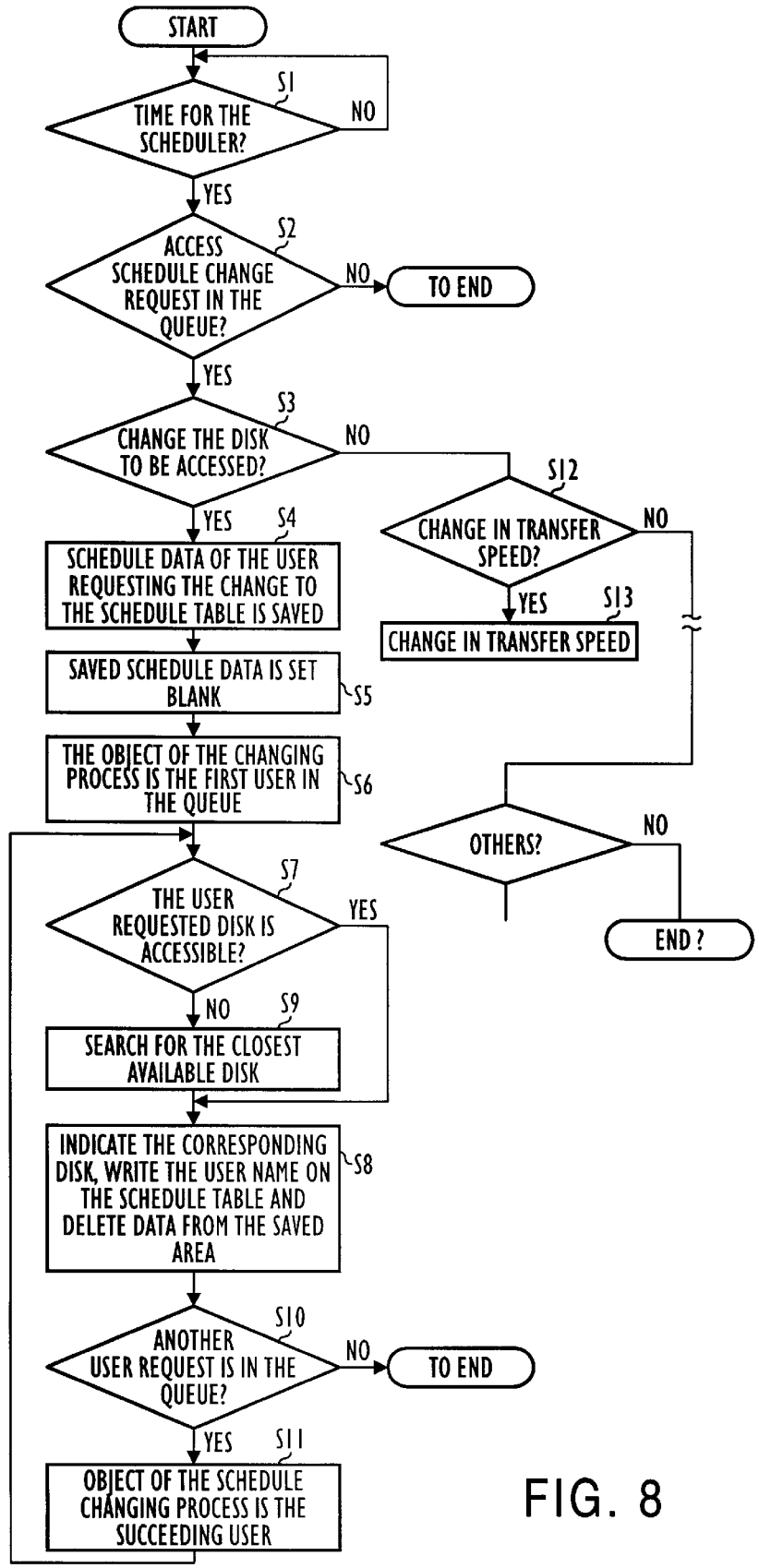
FIG. 8 is a flowchart showing the access schedule changing process.

The contents of the access schedule changing process are described by referring to the flowchart shown in FIG. 8.

First, it is determined whether or not it is time for the scheduler for managing the schedule table to be activated (S1 in FIG. 8). If "yes", it is determined whether or not an access schedule change request from a user is entered in the queue (S2).

If "yes" in S2, it is determined whether or not the user requests to change the disk (storage portion) to be accessed (S3). If "yes" in S3, the schedule data of the user requesting the change to the schedule table 13 is saved (S4), and the saved schedule data is set blank on the schedule data (S5).

Then, the object of the schedule changing process is the first user in the queue (S6). It is further determined whether or not the disk storing the user requested data is accessible (S7).

If "yes" in S7, the user name is written according to the storage portion designation information indicating the corresponding disk to the schedule table 13, and the schedule data saved in the save area is deleted (S8).

If the disk storing the user requested data is being used by another user ("no" in S7), the closest available disk is searched for (S9), and then the process in step S8 is performed.

When the disk storing the user requested data or a corresponding disk is being used by another user, an available disk close to the requested disk is designated for access.

Thus, after the process has been completed in response to the schedule change request from the first user in the queue, it is determined whether or not queue is free (S10). If "yes", the object of the schedule changing process is the succeeding user (S11). If "no" in S10, then the process terminates immediately.

If the user does not request to change his or her access schedule ("no" in S3), it is determined in step S12 whether or not the request refers to the change in transfer speed. If "yes", the transfer speed changing process in step S13 is performed.

Figure 9:
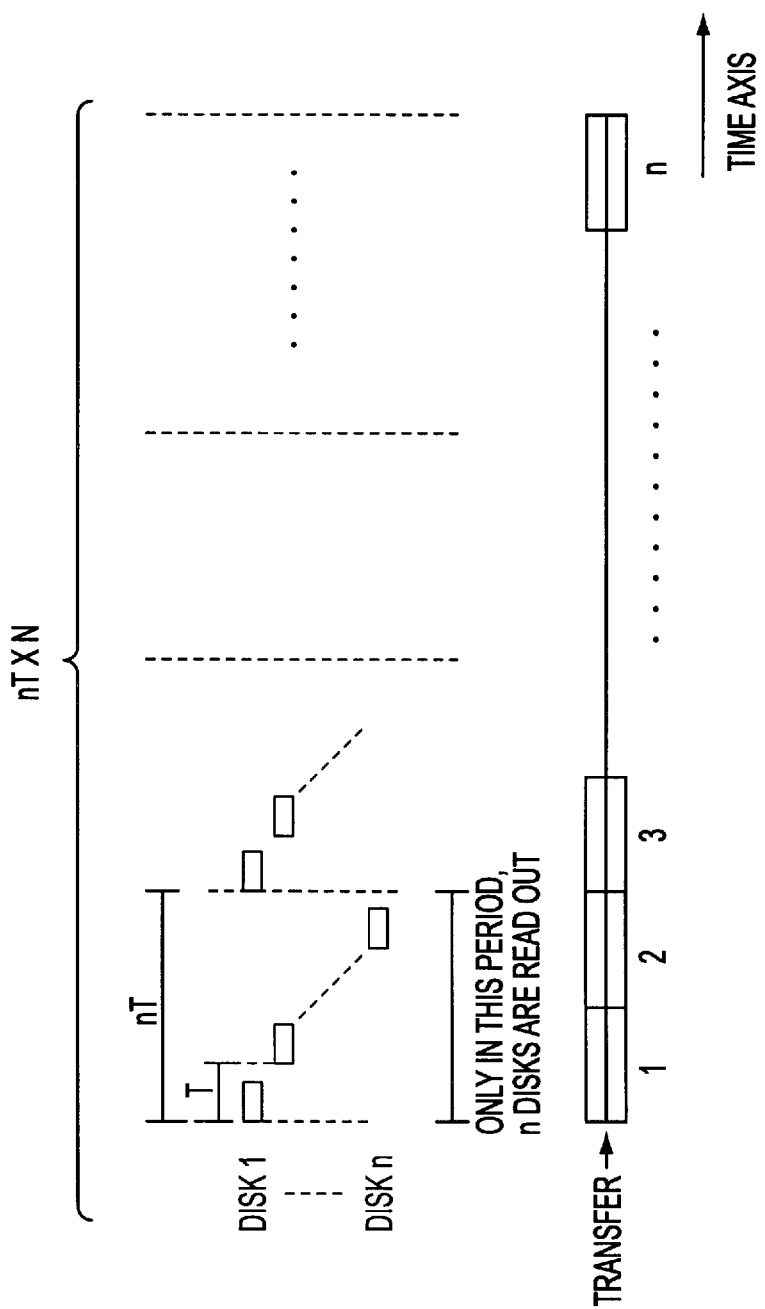
FIG. 9 is a schematic diagram for explaining the change in transfer speed.

In the transfer speed changing process, the data in the period of nT is read from n disks on the cycle T, for example, as shown in FIG. 9, and the read data is sequentially stored in the buffer. Then, the stored data is transferred to the user within the period of nT×N. Since the data can be transferred at a speed 1/N times the data transfer speed in the same cycle T as the reading process, a slow playback can be easily realized at a 1/N speed for video data, for example. In this case, changing the reading speed from the buffer enables the playback to be performed at an optional speed and easily switches from a slow playback speed to the normal speed.

Described below is the case where users A and B issue schedule change requests.

Figure 10:
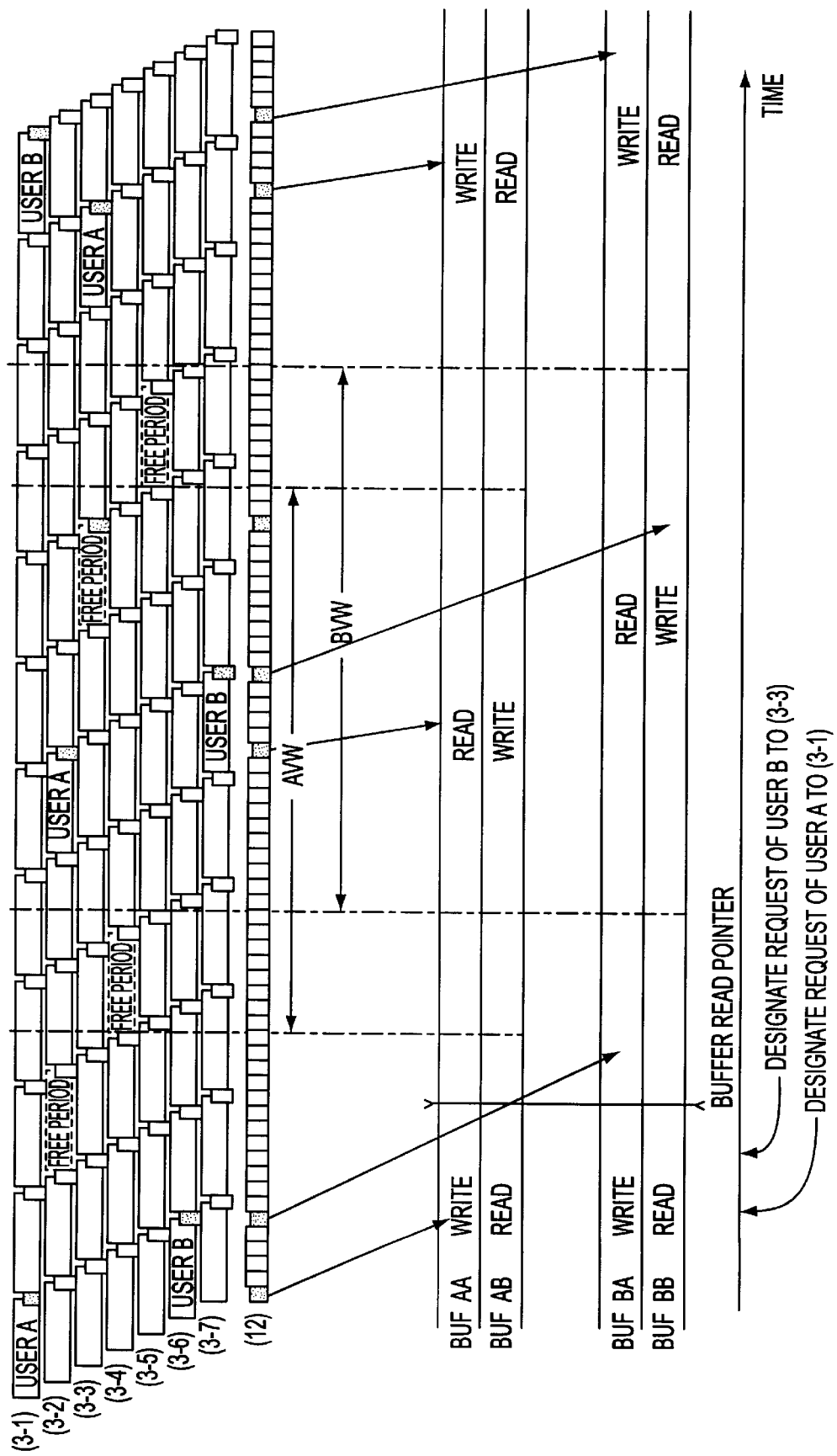
FIG. 10 is a schematic diagram for explaining an access operation for an access schedule changing request.

FIG. 10 is a schematic diagram for explaining an access schedule changing request according to an embodiment of the present invention. In FIG. 8, assume that the number of storage portions is 7. (3-1) to (3-7) are operations of the storage portions 3-1 to 3-7. (12) is transmission data other than a read request and a write request on the common bus 12. BUFAA, BUFAB, BUFBA, and BUFBB are double buffer areas for users A and B of the buffer memory 9 in the control unit 1. AVW and BVW are schedule change valid ranges of the users (request sources) A and B. There are two free time slots, each of which is a period for reading the data block. The free time slots are denoted by dashed lines. FIG. 10 shows the case that services can be provided for 36 users. The buffer read point represents a read pointer that indicates the present read point of the buffer area.

A data block of the user A is read from the storage portion 3-1 as denoted by (3-1) and sent to the common bus 12 as denoted by a black mark (12). The data block is written to the buffer area BUFAA for the user A at the speed corresponding to the transmission speed of the common bus 12. The pre-written data block is read from the other buffer area BUFAB at the speed corresponding to the transmission speed of the user A. A data block of the user A is read from the storage portion 3-2 as denoted by (3-2). The data block is sent to the common bus 12 as denoted by a black mark (12). The data block is written to the buffer area BUFAB for the user A. Likewise, the pre-written data block is read from the buffer area BUFAA and sent to the user A. The data block that is read from the storage portion is written to one of the buffer areas BUFAA and BUFAB for the user A through the common bus 12. The written data block is read from the other buffer area. Thus, the data sequence can be sent to the user A at a predetermined speed.

A data block of the user B is read from the storage portion 3-6 as denoted by (3-6) and sent to the common bus as denoted by a black mark (12). The data block is written to a buffer area BUFBA for the user B at a speed corresponding to the transmission speed of the common bus 12. The pre-written data block is read from the other buffer area BUFBB and sent to the user B. Thereafter, a data block of the user B is read from the storage portion 3-7 as denoted by (3-7) and written to the other buffer area BUFBB for the user B through the common bus 12. On the other hand, the pre-written data block is read from the buffer area BUFBA and the data sequence can be sent to the user B at a predetermined speed.

When an access changing request for accessing a storage portion for the user A as denoted by (3-1) and an access changing request for accessing a storage portion for the user B as denoted by (3-2) are issued, an access schedule is changed using free time slots. For example, the access order of the storage portion 3-2 for the user A is changed to a free time slot of the storage portion 3-4. The access schedule changeable range is equivalent to a read/write period for the buffer areas. The range for the user A is AVW, whereas the range for the user B is BVW. [A]

FIGS. 11 (A) and (B) are schematic diagrams showing contents of the schedule table in the case that users A and B issue respective access schedule changing requests. FIGS. 12 (A) and (B) are schematic diagrams for explaining respective access operations of FIGS. 11 (A) and (B).

The schedule table 13 shown in FIG. 11 (A) stores a plurality of information that represents access situations bf the storage portions 3-1 to 3-7 in this order.

For example, corresponding to the storage portion representing information that represents the storage portion 3-1 of the schedule table 13, a user A, a cylinder number, and a sector number (not shown) that represent the storage position of a data block are stored. At the position after the period T of the schedule table 13, corresponding to the storage portion representing information that represents the storage position of the next data block, a user A, a cylinder number, and a sector number that represent the storage position of the next data block are stored. Thus, the user A can successively access each storage portion at intervals of period T. The storage portions 3-2, 3-3, and so forth that follow the storage portion 3-1 assigned to the user A are assigned to other users (not shown).

Areas corresponding to the storage portions 3-2 and 3-4 for several periods after the position indicated by the pointer are free. At the positions of period T after the storage portions 3-2 and 3-4, areas corresponding to the storage portions 3-3 and 3-5 are free. In other words, each of the storage portions 3-1 to 3-7 has a free period corresponding to one data block.

Assume that the user A issues a rewind and playback request for a video tape and that the first frame (data block) of the video data has been stored in the storage portion 3-1.

At this point, since the storage portion 3-1 that has stored the desired data block is busy, a free storage portion that has stored a data block temporally earlier than the desired data block, and that is closest to the storage portion in the access changeable range AVW, is retrieved from the schedule table 13. This is because a playback operation is performed from a frame preceding the first frame of the desired video data so as to prevent the first frame of the video data from being lost.

Since the storage portion 3-4 satisfies such conditions, a user A, a cylinder number, and a sector number that represent the storage position of the data block that is temporally earlier than the desired data block is written to an area corresponding to the storage portion representing information that represents the storage portion 3-4 of the schedule table 13. In addition, the area corresponding to the storage portion 3-2 that is accessed by the user A is freed.

The storage position of the data block that is temporally earlier than the desired data block can be obtained corresponding to the cylinder number and sector number that represent the storage position of the desired data block, since the data blocks are successively stored in the storage portions 3-1, 3-2, and so forth.

Thereafter, likewise, a user A, a cylinder number, and a sector number that represent the storage position of the next data block are written to a free area corresponding to the storage portion 3-5. In addition, the area corresponding to the storage portion 3-3 that is next accessed by the user A is freed.

When an access destination changing request is issued from the user A, the schedule table 13 is rewritten and free areas corresponding to the storage portions 3-4 and 4-5 are assigned to the user A. Thus, the schedule change can be easily performed.

In addition, when the schedule table 13 is rewritten, the areas assigned to the user A are freed. Thus, a free period of a storage portion can be always prepared for a schedule changing request issued from a new user.

As the result of the schedule change of the schedule table 13, as denoted by an arrow in FIG. 12 (a), a free time slot of the storage portion 3-4 is assigned to the user after the time slot of the storage portion 3-1. Thus, the time slot of the storage portion 3-2 that is the next access destination for the user A is freed. Thereafter, free time slots of the storage portions 3-5, 3-6, and so forth for every period T are assigned to the user A.

Thus, a playback operation can be performed from a frame just preceding the first frame of designated video data.

Next, with reference to FIGS. 11 (B) and 12, the changed contents of the schedule table 13 and the access operation in the case that an access schedule changing request is issued from the user B after the access schedule of the user A is changed will be explained.

At this point, as shown in FIG. 11 (B), corresponding to the storage portion representing information that represents the storage portion 3-6, a user B, a cylinder number, and a sector number that represent the storage position of the data block are stored in the schedule table 13. At the position of the period T after the pointer of the schedule table 13, corresponding to the storage portion 3-7, a user B, a cylinder number, and a sector number that represent the storage position of the next data block are stored.

After the schedule change of the user A is performed, areas corresponding to the storage portion 3-2 after period T from the pointer are freed.

Assume that a rewind and playback request of video data is issued from the user B and that the first data block of the video data has been stored in the storage portion 3-3.

In this case, as shown in the schedule table 13 of FIG. 11 (B), since an area corresponding to the storage portion 3-3 is free, corresponding to the storage portion 3-3, a user B, a cylinder number, and a sector number that represent the first data block of the video data are written. In addition, the area corresponding to the storage portion 3-7 assigned to the user B is freed. Likewise, corresponding to free areas of the storage portions 3-4, 3-5, and so forth, a user B, a cylinder number, and a sector number that represent the storage position of each of data blocks that follow are successively written.

As the result of the schedule changing request to the schedule table 13, as denoted by an arrow in FIG. 12 (b), the free time slot of the storage portion 3-3 is assigned to the user B after the time slot of the storage portion 3-6. In addition, the time slot of the storage portion 3-7 that is next accessed from the user B is freed. The free time slots of the storage portions 3-4, 3-5, and so forth on every period T are successively assigned to the user B.

Thus, the playback operation can be successively performed from the first frame of the designated video data stored in the storage portion 3-3.

The free period of each storage portion of the schedule table 13 can be designated to any period. When the blank access period is different from an access period issued from the user, the speed of data that is read from the buffer memory can be controlled so that data is sent at the speed requested by the user.

Next, another embodiment of the present invention will be described. In this embodiment, when a plurality of access schedule changing requests are issued, the execution order of the access schedule changing requests issued from users are arranged so that a desired data block can be accessed.

Consider the case that a user A and a user B successively issue respective rewind playback requests of video data. In addition, consider that the first frame (data block) of the video data requested from the user A has been stored in the storage portion 3-1 and the first frame of video data requested from the user B has been stored in the storage portion 3-3.

Figure 13:
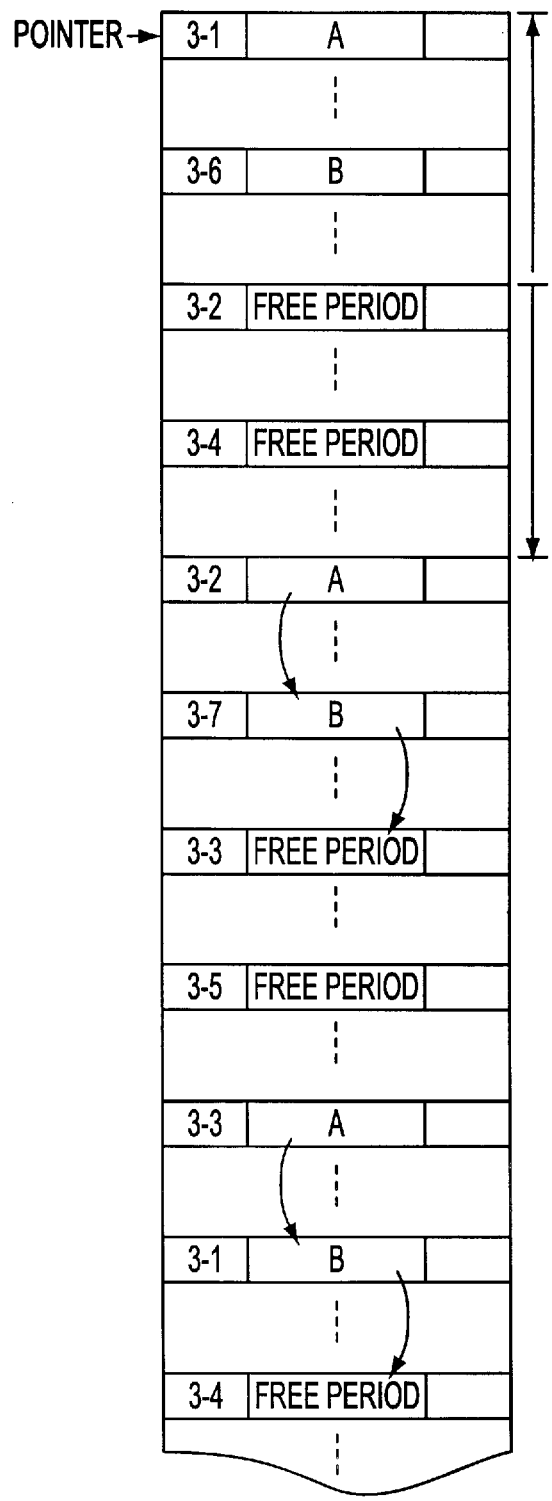
FIG. 13 is a schematic diagram showing changed contents of the schedule table in the case that schedule changing requests issued by a plurality of users are arranged and executed.

Firstly, it is determined whether or not there is a free period as an access changing destination in an access schedule changeable range for the user A or the user B in the schedule table 13 shown in FIG. 13. When there is a free storage portion as an access changing destination, the storage portion is changed to the next access destination. Thereafter, it is determined whether or not the new free storage portion accords with a new access destination of another user or an adjacent destination thereof.

In this case, the storage portion 3-1 of the schedule table 13 is busy, whereas the storage portion 3-3 in the next period of the pointer is free. At an area corresponding to the storage portion 3-3 of the schedule table 13, a user B, a cylinder number, and a sector number that represent the storage position of the first data block of the video data to be played back are written. In addition, the area corresponding to the storage portion 3-7 that is the next access destination of the user B is freed.

On the other hand, the storage portion 3-1 that stores the first data block of the video data for the playback request issued from the user A is busy. Thus, a free storage portion that stores a data block temporally earlier than the desired data block is retrieved from the schedule table 13. At this point, the storage portion 3-7 that stores a data block just preceding a data block stored in the storage portion 3-1 is free due to the result of the schedule changing request issued from the user B. Thus, a user A, a cylinder number, and a sector number that represent the storage position of the data block that just precedes the desired data block are written to an area corresponding to the storage portion 3-7 of the schedule table 13. In addition, the area corresponding to the storage portion 3-2 assigned to the user A is freed.

Likewise, a user B and information that represents the storage position of the next data block are written to a free region corresponding to the storage portion 3-4 that follows the area corresponding to the storage portion 3-3. A user A and information that represents the storage position of the next data block are written to the free area of the storage portion 3-1. In addition, the area corresponding to the storage portion 3-3 that is the next access destination of the user A is freed.

Figure 14:
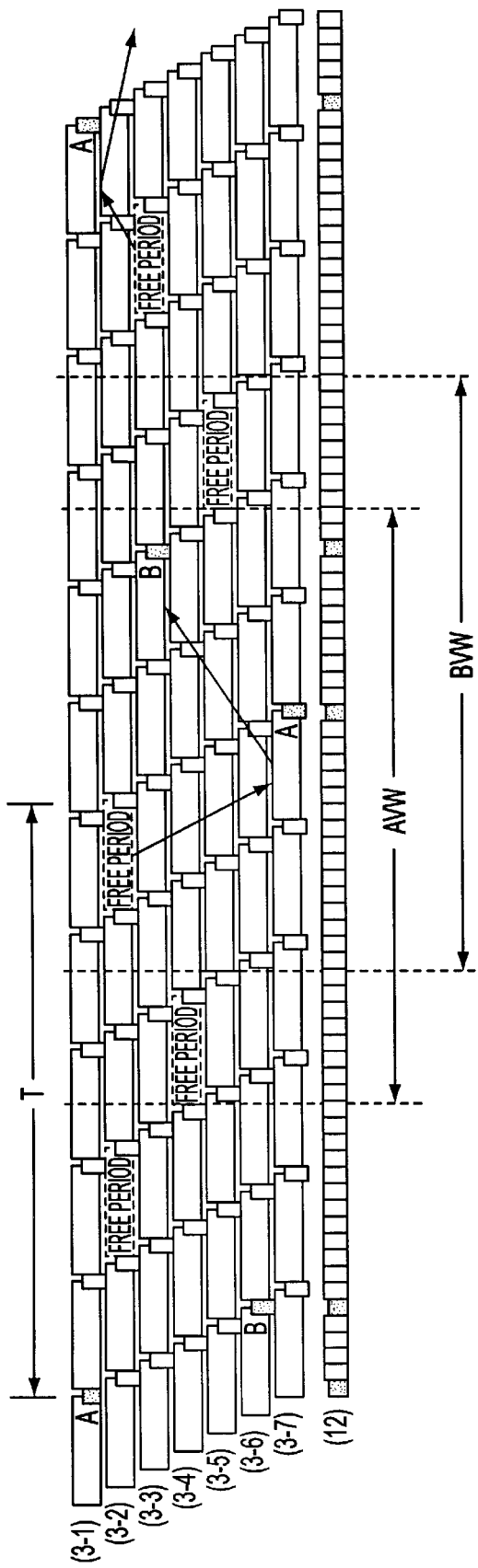
FIG. 14 is a schematic diagram for explaining an access operation in the case that schedule changing requests issued by a plurality of users are arranged and executed.

As the result of the schedule change of the schedule table, as denoted by an arrow mark in FIG. 14, the free time slot of the storage portion 3-3 that follows the time slot of the storage portion 3-6 is assigned to the user B. In addition, the time slot of the storage portion 3-7 that is the next access destination of the user B is freed. The free time slot of the storage portion 3-7 is assigned to the user A.

When schedule changing requests are issued from a plurality of users, the access schedule changing requests are not processed in the order of occurrences thereof. Instead, the access schedule changing requests is arranged in the order of executions. Thus, using a free storage portion due to an access schedule changing request issued from a different user, a storage portion that stores a data block requested by another user or an adjacent data block can be accessed.

The above-described access schedule changes can be performed by rewriting the schedule table (see FIGS. 2 and 5). When an access changing request is issued from the user A, if the desired storage portion (desired data block) cannot be accessed, the access destination is changed to a storage portion (data block) that is closest to the desired storage portion (desired data block). Thereafter, the storage portion (data block) is accessed every access period T, thereby obtaining successive data.

When video data is played back from a desired picture, even if the desired picture deviates for several frames, the resultant picture is not adversely affected. Thus, the rest of the video data can be successively played back. In other words, when the rewind operation or fast forward operation is performed, if the desired time slot is not present, the desired picture cannot be displayed from the first frame. In this case, when the access schedule of the storage portion is changed and a frame adjacent to the desired frame is played back, pictures are successively played back. This operation also applies to audio data.

The present invention is not limited to the above-described embodiments. Instead, various modifications are available. When the number of storage portions that construct the storage unit 2 increases and the transmission speed of the common bus 12 increases corresponding to the scale of the system, many users can access the system. In addition to the video data, audio data and various sequential data can be distributively written or read. Moreover, as described above, the amount of data in a data block may be varied corresponding to the type of sequential data, the transmission speed of the user, and so forth. When the storage unit 2 corresponding to the accessing method of the present invention has a plurality of storage portions, the present invention can be applied to various configurations other than that shown in FIG. 2.

As describe above, the control unit 1 totally manages the storage portions 3-1 to 3-n of the storage unit 2. The control unit 1 determines whether or not to accept access requests to the storage portions 3-1 to 3-n and easily processes access changing requests and so forth with reference to the schedule table 13. In particular, since the schedule table has at least a free period, a desired data block or an adjacent data block thereof can be easily accessed against an access schedule changing request.

Since a free period that is used for an access schedule changing request can be used for a process other than the access control of the control unit 1, the system efficiency can be improved. Moreover, in the case that the buffer memory 9 of the control unit 1 is constructed in a FIFO format or a double-buffer format, when an access schedule is changed, data can be successively sent to the user at a predetermined transmission speed.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A controlling unit for use with a storage unit for dividing a plurality of types of data sequences into data blocks and distributively writing the data blocks to a plurality of storage portions of the storage unit or successively reading each of the data blocks of the data sequence from the storage portions, comprising:

a schedule table for managing access situations of the storage portions of the storage unit for each of the data blocks; and access control means for causing an area for storing access situations of the storage portions to have respective free periods corresponding to data blocks and for changing an access destination using the free periods of the storage portions when a schedule changing request is issued from a user.

2. The control unit as set forth in claim 1, wherein the schedule table comprises:

a first area for storing storage portion representing information that designates one of the storage portions;

a second area for storing an access request source; and a third area for storing storage position information that represents a storage position of the data block in the storage portion, and wherein said access control means is adapted for writing the storage position representing information of each of the storage portions to the first area and writing at least information that represents a free state to the second area so as to provide each storage portion with a free period corresponding to one data block and for successively designating free storage portions on the schedule table as new access destinations when the schedule changing request is issued.

3. The control unit as set forth in claim 1, wherein said access control means is adapted for executing other than an access control process for the storage portions using free periods of the schedule table.

4. A control unit for use with a storage unit for dividing a plurality of types of data sequences into data blocks and distributively writing the data blocks to a plurality of storage portions of the storage unit or successively reading each of the data blocks of the data sequence from the storage portions, comprising:

a schedule table for managing access situations of the storage portions of the storage unit for each of the data blocks; and access control means for causing an area for storing access situations of the storage portions to have respective free periods corresponding to data blocks and for changing an access destination using the free periods of the storage portions when a schedule changing request is issued from a user;

wherein said access control means is adapted for determining whether or not a storage portion as an access destination is the free period when the schedule changing request for changing the access order of the data sequence or for accessing another data sequence is issued, and wherein said access control means is adapted for designating the free storage portion as the next access destination for the user when the storage portion of the desired access destination is free.

5. A method of accessing a storage unit for dividing each of a plurality of types of data sequences into data blocks, for sequentially writing the divided data blocks to a plurality of storage portions, and for sequentially reading the data blocks of the plurality of types of data sequences from the plurality of storage portions, the method comprising the steps of:

providing a schedule table for managing access situations for the plurality of storage portions;

sequentially providing a free period corresponding to each of the data blocks for each of the plurality of storage portions, in an area storing a request source of each of the plurality of storage portions in the schedule table; and referencing the schedule table and changing an access destination by using the free period corresponding to each of the plurality of storage portions in the schedule table according to an access change request, when the access change request for changing an access order of a data sequence or for accessing another data sequence is made.

6. The method of accessing the storage unit as set forth in claim 5, further comprising the steps of:

storing storage portion designation information indicating one of the plurality of storage portions in a first area in the schedule table;

storing an access request source for each of the plurality of storage portions and sequentially providing a free period corresponding to each of the plurality of storage portion in a second area in the schedule table; and storing storage location information indicating a storage location in a storage portion storing a data block in a third area in the schedule table;

designating a corresponding storage portion specified by information of the first area corresponding to a storage area having the free period in the second area in the schedule table, as a next access destination when a schedule change request is made.

7. The method of accessing the storage unit as set forth in claim 6, further comprising the steps of:

collecting information necessary for accessing the next data block bases on the information of the first area, the second area, and the third area of the schedule table; and storing the collected information to the first area, the second area, and the third area that are accessed in the next access period.

8. The method of accessing the storage unit as set forth in claim 5, which further includes the steps of:

changing an access destination using a free period of each of the storage portions and reading a desired data block from the changed access destination when the schedule changing request is issued from a user; and sending the data block through a first-in-first-out type of buffer memory at a transmission speed designated by the user.

9. The method of accessing the storage unit as set forth in claim 5, further comprising the step of:

executing other than an access control process for the storage portions in free periods of the schedule table.

10. A method of accessing a storage unit for dividing each of a plurality of types of data sequences into data blocks, for sequentially writing the divided data blocks to a plurality of storage portions, and for sequentially reading the data blocks of the plurality of types of data sequences from the plurality of storage portions, the method comprising the steps of:

providing a schedule table for managing access situations for the plurality of storage portions;

sequentially providing a free period corresponding to each of the data blocks for each of the plurality of storage portions, in an area storing a request source of each of the plurality of storage portions in the schedule table;

referencing the schedule table and changing an access destination by using the free period corresponding to each of the plurality of storage portions in the schedule table according to an access change request, when the access change request for changing an access order of a data sequence or for accessing another data sequence is made;

referencing the schedule table and determining whether or not a storage portion of an access destination corresponding to the schedule changing request is the free period when the schedule changing request for changing the access order of a data sequence or for accessing another type of a data sequence is issued; and designating the free storage portion as a next access destination for the schedule changing request of a user and designating next free storage portions as next access destinations when the storage portion of a desired access destination is free.

11. A method of accessing a storage unit for dividing each of a plurality of types of data sequences into data blocks, for sequentially writing the divided data blocks to a plurality of storage portions, and for sequentially reading the data blocks of the plurality of types of data sequences from the plurality of storage portions, the method comprising the steps of:

providing a schedule table for managing access situations for the plurality of storage portions;

sequentially providing a free period corresponding to each of the data blocks for each of the plurality of storage portions, in an area storing a request source of each of the plurality of storage portions in the schedule table;

referencing the schedule table and changing an access destination by using the free period corresponding to each of the plurality of storage portions in the schedule table according to an access change request, when the access change request for changing an access order of a data sequence or for accessing another data sequence is made;

referencing the schedule table and determining whether or not a storage portion of an access destination corresponding to the schedule changing request is the free period when the schedule changing request for changing the access order of a data sequence or for accessing another type of a data sequence is issued;

designating the free storage portion as a next access destination for the schedule changing request of a user and designating next free storage portions as next access destinations when the storage portion of a desired access destination is free; and designating a free storage portion for storing a data block separated by a predetermined number of data blocks from the first data block corresponding to the schedule changing request as the next access destination when the storage portion of the desired access destination is not free.

* * * * *